(12) United States Patent
Walker et al.

(10) Patent No.: US 10,138,109 B2
(45) Date of Patent: Nov. 27, 2018

(54) SYSTEM FOR WIRELESSLY CHARGING AN ILLUMINATED TAP HANDLE

(71) Applicants: Andrew S. Walker, Vero Beach, FL (US); James R. Lester, Lambton Shores (CA); Brian D. G. Maxfield, Camlachie (CA)

(72) Inventors: Andrew S. Walker, Vero Beach, FL (US); James R. Lester, Lambton Shores (CA); Brian D. G. Maxfield, Camlachie (CA)

(73) Assignee: ILLUMITAP LLC, Boynton Beach, FL (US)

( * ) Notice: Subject to any disclaimer, the term of this patent is extended or adjusted under 35 U.S.C. 154(b) by 153 days.

(21) Appl. No.: 15/393,133

(22) Filed: Dec. 28, 2016

(65) Prior Publication Data

US 2017/0107093 A1  Apr. 20, 2017

Related U.S. Application Data

(63) Continuation-in-part of application No. 14/613,063, filed on Feb. 3, 2015, now Pat. No. 9,868,625, and a
(Continued)

(51) Int. Cl.
| | |
|---|---|
| *B67D 1/08* | (2006.01) |
| *H02J 7/02* | (2016.01) |
| *H02J 50/20* | (2016.01) |
| *H02J 50/12* | (2016.01) |
| *F21Y 115/10* | (2016.01) |

(Continued)

(52) U.S. Cl.
CPC .......... *B67D 1/0874* (2013.01); *H02J 7/025* (2013.01); *H02J 50/12* (2016.02); *H02J 50/20* (2016.02); *B67D 1/1477* (2013.01); *F21Y 2115/10* (2016.08); *H04L 12/28* (2013.01)

(58) Field of Classification Search
CPC . B67D 1/0874; B67D 1/1477; F21Y 2115/10; H02J 7/025; H02J 12/28; H02J 50/12; H02J 50/20
See application file for complete search history.

(56) References Cited

U.S. PATENT DOCUMENTS

| | | | |
|---|---|---|---|
| 9,079,759 B2 * | 7/2015 | Walker | B67D 1/0874 |
| 9,567,202 B2 * | 2/2017 | Walker | B67D 1/0874 |

(Continued)

*Primary Examiner* — Stephen F Husar (57) ABSTRACT

A system for wirelessly charging an illuminated tap handle includes a tap handle and a wireless power unit. The tap handle includes a receiver coupling device, at least one light-emitting diode (LED) light, a transparent body, handle attachment, a handle chipset, and a personal-area network module. The handle attachment attaches the tap handle to existing beer tower opposite of the transparent body so that the existing beer tower can be operated through the tap handle. The transparent body is illuminated by the LED light that is communicably coupled to the handle chipset along with the personal-area network module. A transmitter coupling device of the wireless power unit communicably coupled with the receiver coupling device so that the handle chipset, the LED light, and the personal-area network module can be electrically powered as the transmitter coupling device is electrically connected to an external electrical outlet.

11 Claims, 9 Drawing Sheets

Related U.S. Application Data continuation-in-part of application No. 13/856,010, filed on Apr. 3, 2013, now Pat. No. 9,567,202, said application No. 14/613,063 is a continuation-in-part of application No. 13/856,010, filed on Apr. 3, 2013, now Pat. No. 9,567,202, which is a continuation-in-part of application No. 13/403,185, filed on Feb. 23, 2012, now Pat. No. 9,079,759.

(60) Provisional application No. 61/585,471, filed on Jan. 11, 2012.

(51) Int. Cl.
*B67D 1/14* (2006.01)
*H04L 12/28* (2006.01)

(56) References Cited

U.S. PATENT DOCUMENTS

| | | | | |
|---|---|---|---|---|
| 9,868,625 | B2* | 1/2018 | Walker | B67D 1/0874 |
| 2015/0368086 | A1* | 12/2015 | Sacchetti | B67D 1/0888 |
| | | | | 222/192 |

* cited by examiner

SYSTEM FOR WIRELESSLY CHARGING AN ILLUMINATED TAP HANDLE

The current application is a continuation in part of U.S. Non-Provisional patent application Ser. No. 14/613,063 filed Feb. 3, 2015, which is a continuation in part of U.S. Non-Provisional patent application Ser. No. 13/856,010 filed Apr. 3, 2013, which is a continuation in part of U.S. Non-Provisional patent application Ser. No. 13/403,185 filed Feb. 23, 2012, which claims benefit of U.S. Provisional Patent application Ser. No. 61/585,471 filed Jan. 11, 2012.

FIELD OF THE INVENTION

The present invention relates generally to a system for wirelessly charging an illuminated tap handle. More specifically, the system comprises a tap handle and a wireless power unit as the tap handle communicably connects with the wireless power unit and a plurality of web enabled computing devices.

BACKGROUND OF THE INVENTION

Beer tap handles have been used by a wide variety of organizations for centuries in order to dispense beer and other type of liquids. The beer tap handles have evolved into many different shapes and forms throughout the years as the beer tap handles are able to provide additional functionality in addition to dispensing beer. For example, different types of beer tap handles are often used to display different designs and decals for promotional purposes. Even though most of the beer handles are designed in regards to different promotional purposes, the displayed promotional messages are barely visible to the customers due to the low-lighting profiles of the respective establishments. In addition to the aforementioned usages, the beer tap handles have not been able to provide any other useful features to an establishment that uses the beer tap handles or the customers of the respective establishment.

It is therefore an object of the present invention to introduce a system for wirelessly powering an illuminated tap handle. More specifically, a tap handle of the present invention is wirelessly powered through a wireless power unit that is adjacently positioned to the tap handle. The present invention utilizes multiple wireless power transmitting technologies, such as radio wave, induction charging, and magnetic resonance, to optimize the functionality and the operating conditions of the tap handle. The present invention also allows the users to control the desired lighting effects of the tap handle. It is further objectives of the present invention to provide a wireless internet network and text messaging technology so that the customers of an establishment can join the wireless internet network to use the internet while the owners of the respective establishment are able to promote their business through the text messaging technology.

DETAIL DESCRIPTIONS OF THE INVENTION

All illustrations of the drawings are for the purpose of describing selected versions of the present invention and are not intended to limit the scope of the present invention.

Figure 1:
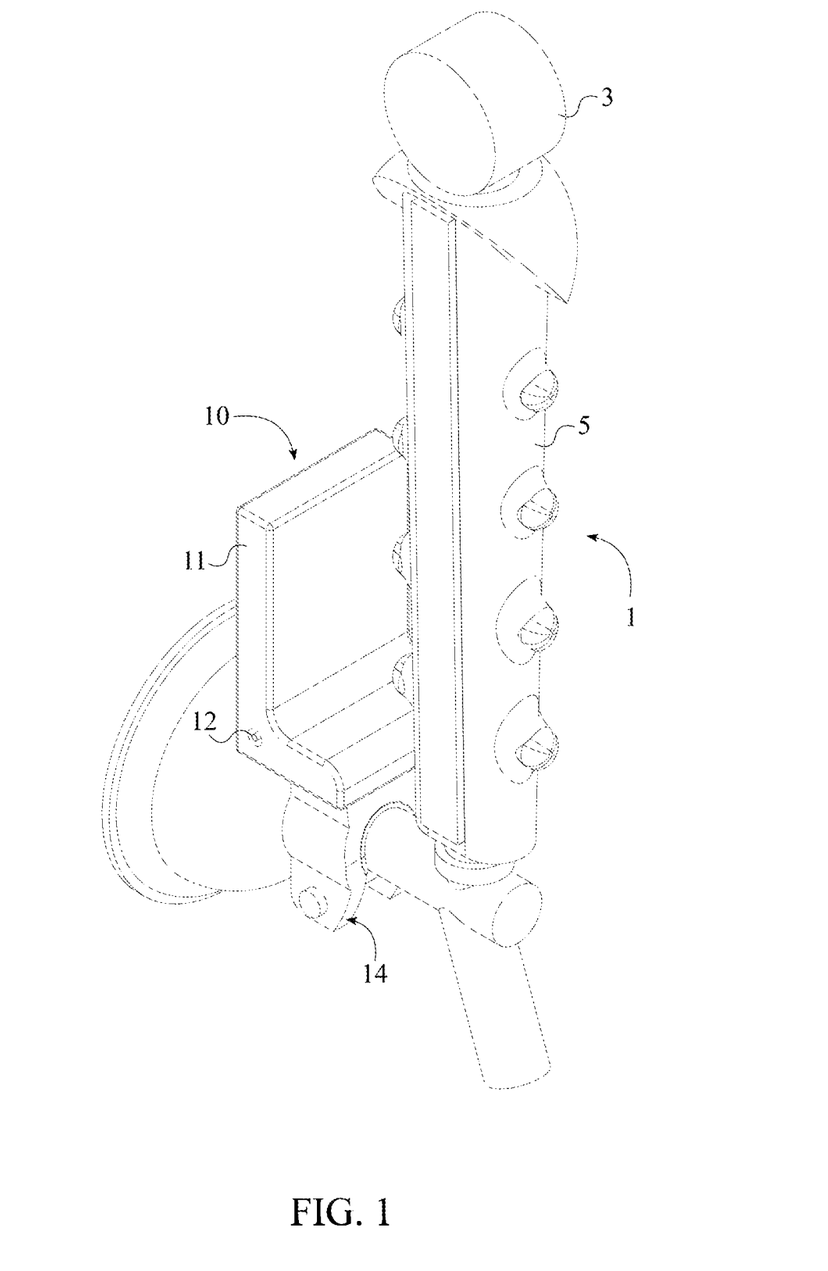
FIG. 1 is a perspective view of the tap handle and the wireless power unit of the present invention.

The present invention is a system for wirelessly charging an illuminated tap handle 1 that comprises a tap handle 1 and a wireless power unit 10 as shown in FIG. 1. The tap handle 1 is used within restaurants and bars so that beer or any other types of beverage can be drafted from a pressurized container as the tap handle 1 is attached with an existing beer tower. In reference to the general configuration of the present invention, the wireless power unit 10 is adjacently positioned to the tap handle 1. The wireless power unit 10 is communicably coupled with the tap handle 1, wherein the wireless power unit 10 continuously powers at least one light-emitting diode (LED) light 2, a handle chipset 7, and a personal-area network module 8 of the tap handle 1.

Figure 2:
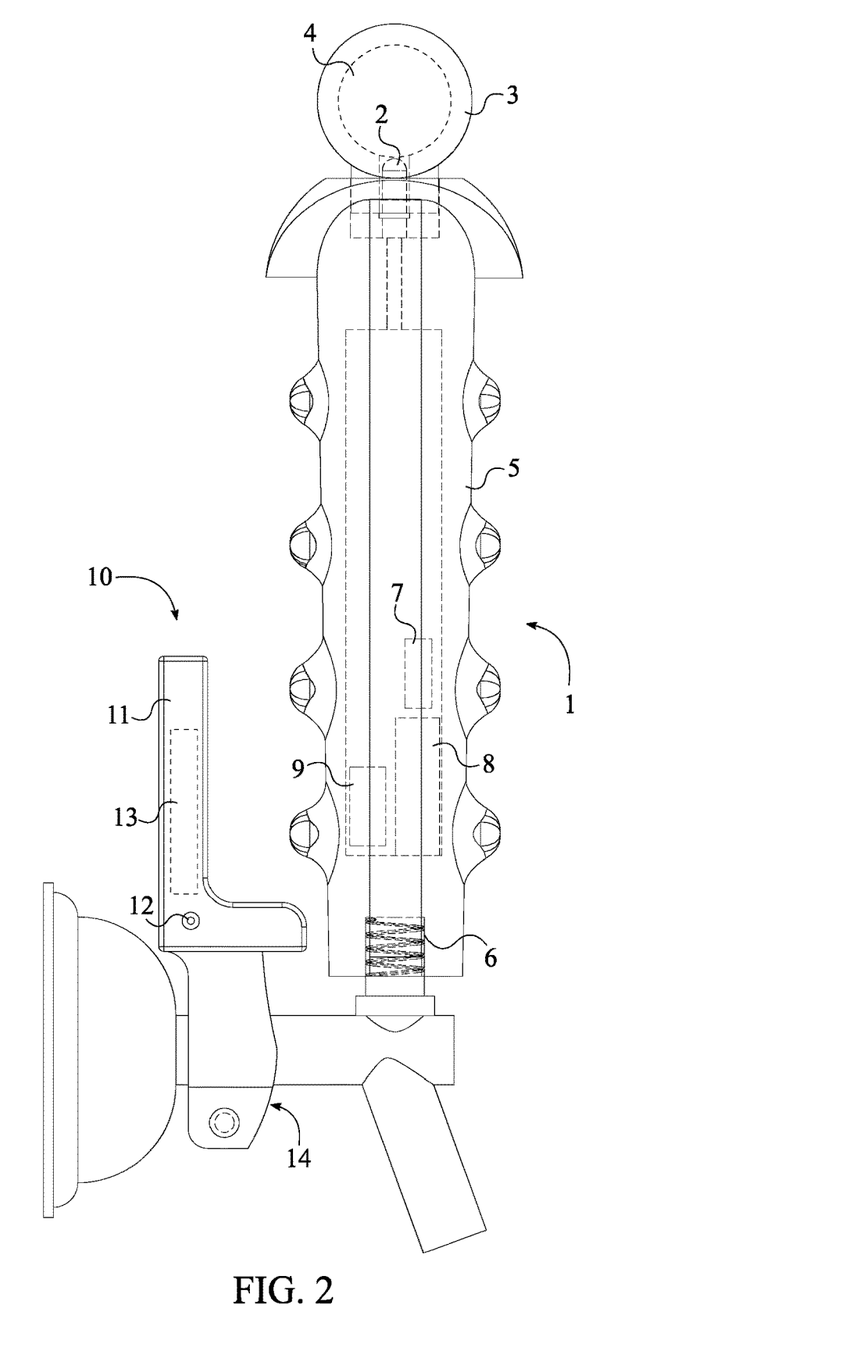
FIG. 2 is a side view of the present invention showing internal components, such as the LED light, the handle chipset, the personal-area network module, the receiver coupling device, and the transmitter coupling device.
Figure 3:
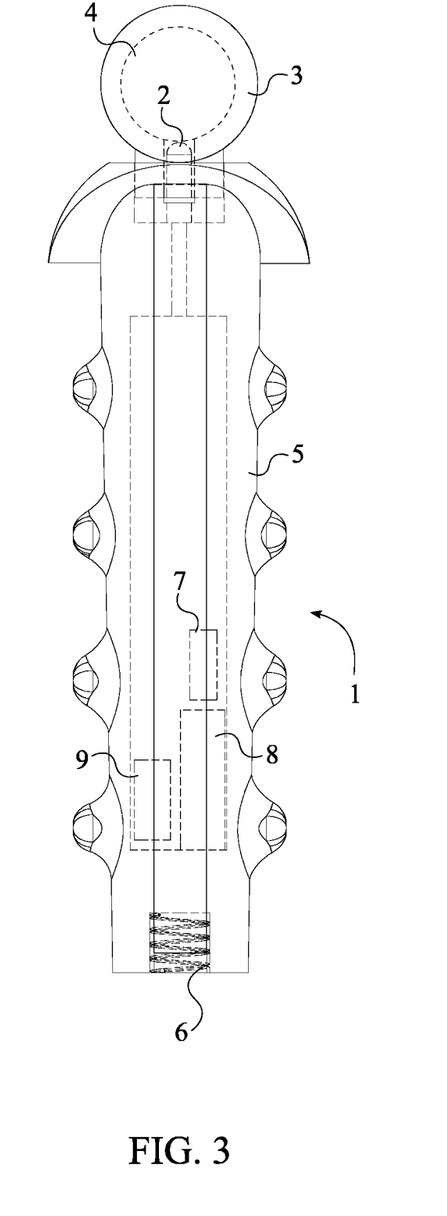
FIG. 3 is a side view of the tap handle showing internal components, such as the LED light, the handle chipset, the personal-area network module, and the receiver coupling device.

In reference to FIG. 1-FIG. 3, the tap handle 1 further comprises a transparent body 3, a handle attachment 5, and a receiver coupling device 9 in addition to the LED light 2, the handle chipset 7, and the personal-area network module 8. The handle attachment 5 provides the necessary gripping-surface area for the tap handle 1 so that the users can operate the beer tower to dispense beer. The handle attachment 5 also functions as a base for the internal components and the external components of the tap handle 1. More specifically, the handle chipset 7 and the personal-area network module 8 are internally positioned within the handle attachment 5. The LED light 2 is terminally mounted to the handle attachment 5 while the transparent body 3 is terminally and hermetically mounted to the handle attachment 5. In other words, the LED light 2 is concentrically and internally positioned within the transparent body 3 so that the transparent body 3 can be illuminated through the LED light 2. Since the handle chipset 7, the personal-area network module 8, and the LED light 2 are either internally positioned or hermetically mounted to the handle attachment 5, the usual damages that can occur in relation to liquid contaminations and heavy use of the tap handle 1 are completely eliminated from the present invention.

In reference to FIG. 1-FIG. 3, the handle attachment 5 is shaped into an elongated body in order to provide proper gripping-surface area. The exterior surface of the elongated body is ergonomically shaped so that the users are able to comfortably grip the tap handle 1. The handle attachment 5 is designed to mount the tap handle 1 with the existing models of beer towers in use today. The handle attachment 5 further comprises a bottom connector 6 that is concentrically traversed into the handle attachment 5. The bottom connector 6, preferably a female threaded connection, enables the tap handle 1 to be connected with the existing beer towers installed in restaurants and bars across North America, since the existing beer towers generally comprise male threaded connections. According to the demand, the female threaded connection of the bottom connector 6 can be changed into a male threaded connection, if the existing beer towers comprise female threaded connections. The elongated body is preferably made from stainless steel or plastic; however, the elongated body can be made out of any other type of corrosion free and durable materials such as tempered glass, composite materials, and different alloy materials.

In reference to FIG. 2, the transparent body 3 comprises a cavity 4 so that the LED light 2 can be positioned within the cavity 4 while the transparent body 3 is hermetically mounted with the handle attachment 5. The cavity 4 is traversed into transparent body 3 from a bottom end of the transparent body 3 so that the cavity 4 is able to align with the LED light 2. More specifically, the LED light 2 is concentrically and internally positioned within the cavity 4 allowing the transparent body 3 to be illuminated. The transparent body 3 is preferably made from synthetic resin materials and can be finished through laser etching technology and/or can be painted with desired colors. Additionally, the laser etching technology creates fine detailed transparent body 3 and allows the light to effectively shine through the transparent body 3. Even though the transparent body 3 is preferably made from synthetic resin materials, the transparent body 3 can also be made from stronger and more durable materials such as clear plastic, tempered glass, and composite materials. The transparent body 3 can be made into different decals and different shapes in order to relate with different beer companies, different branding requirements, different logos, and different marketing embodiment such as sports team logos.

Figure 5:
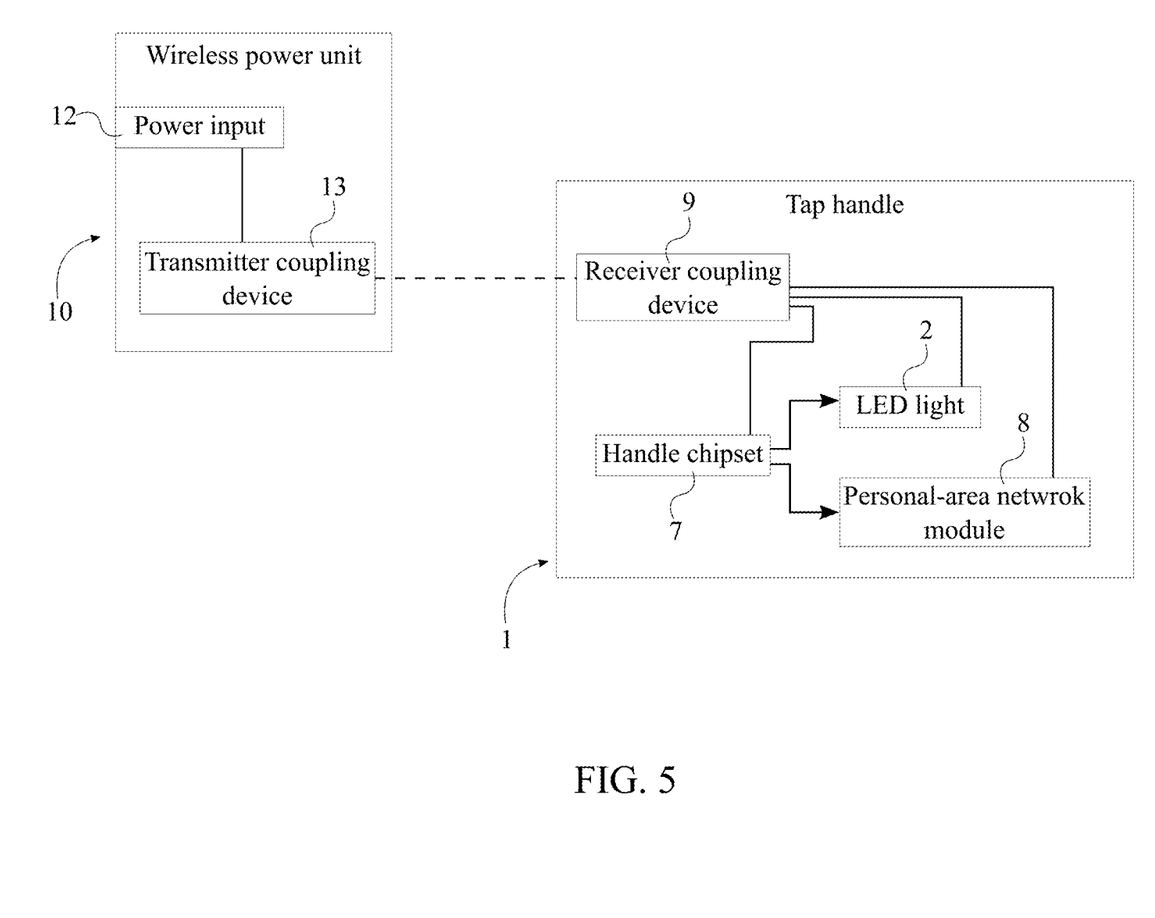
FIG. 5 is a schematic diagram showing electrical and communicably connection of the tap handle and the wireless power unit of the present invention.

In reference to FIG. 5, the LED light 2 that provides the lighting effects to the tap handle 1 is communicably coupled with the handle chipset 7 so that the handle chipset 7 is able to control the LED light 2 within the present invention. The LED light 2 can be either red, green, blue, or white illumination as the mentioned four different colors allow the users of the present invention to have the complete control over the color spectrum. For example, if the transparent body 3 is painted, the LED light 2 illuminates in white color so that the painted transparent body 3 can be clearly displayed with the designated colors. If the users of the present invention decide to simply use one specific color to illuminate the tap handle 1, the users are able to select that one specific color through a remote-control device or a remote computing device that is communicably coupled with the handle chipset 7. Having the ability to change the color scheme with the present invention is a unique improvement so that the tap handle 1 can be used with personalized events which comprise specific color themes and holidays associated with specific colors. For example, the tap handle 1 can be illuminated with red color around the Valentine's Day, providing an aesthetically pleasing surrounding area for an establishment.

Figure 6:
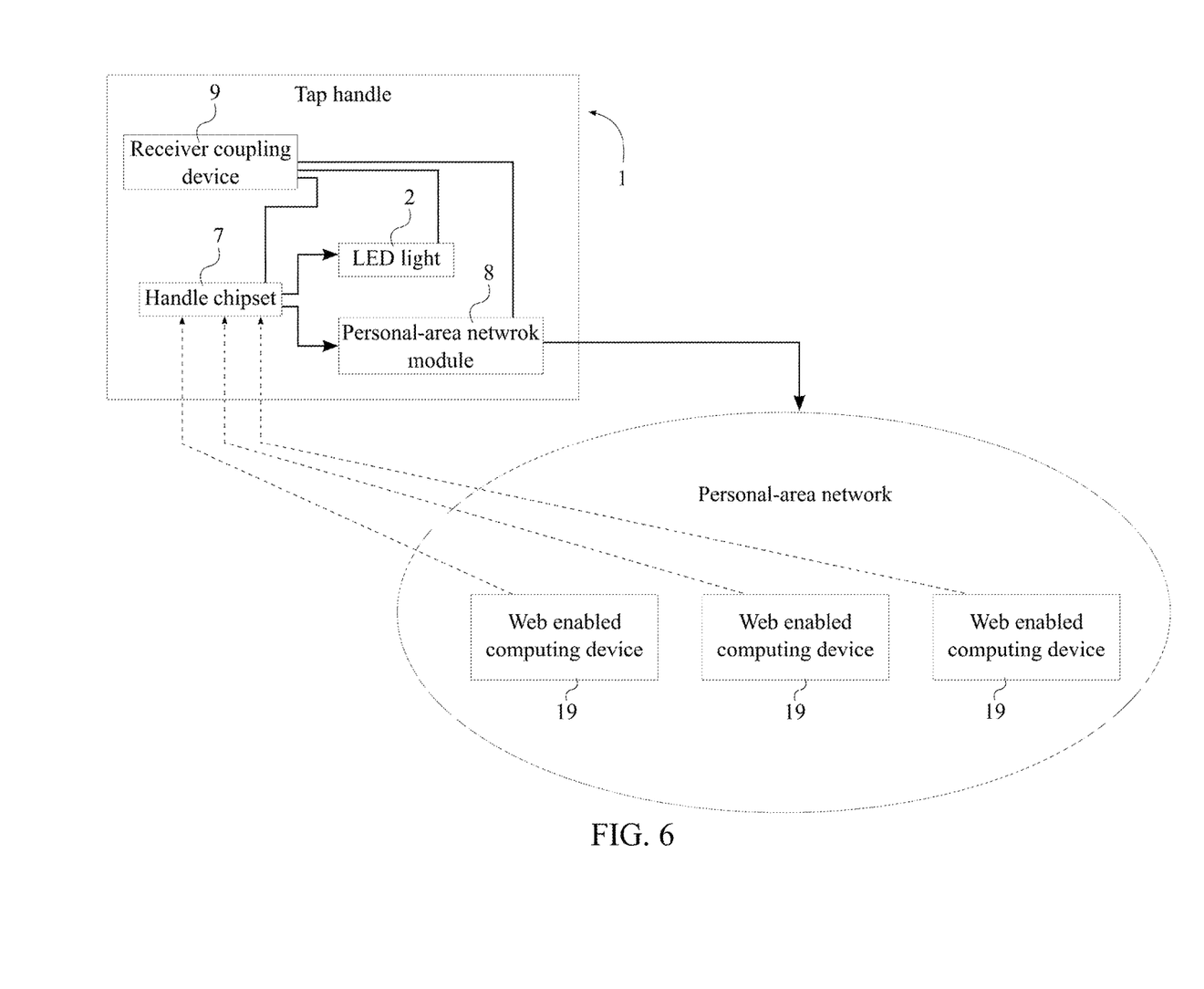
FIG. 6 is a schematic diagram showing the communicably connection of the plurality of web enabled computing device within the personal-area network.

In reference to FIG. 5-6, the personal-area network module 8 is communicably coupled with the handle chipset 7. The personal-area network module 8 provides a personal-area network with a predetermined coverage area so that the tap handle 1 is able to interact with the customers through a plurality of web enabled computing devices 19. In order to for the tap handle 1 to interact with customers, the tap handle 1 is communicably coupled with the plurality of web enabled computing devices 19 through the personal-area network module 8 as the plurality of web enabled computing devices 19 can include, but not limited to, laptops, smartphones, and tablets. More specifically, once the plurality of web enabled computing devices 19 positions within the predetermined coverage area of the personal-area network, and the plurality of web enabled computing devices 19 is capable of operating within the personal-area network, the plurality of web enabled computing devices 19 is able to communicably coupled with the tap handle 1 through the personal-area network module 8. Then, the handle chipset 7 of the tap handle 1 automatically sends the short text message with a website landing link to the plurality of web enabled computing devices 19 through the personal-area network, where the short text message with a website landing link optimizes direct marketing. The handle chipset 7 is able to process the short text message within the tap handle 1 as the handle chipset 7 functions as the processor unit of the tap handle 1. For example, the short text message with a website landing link can be a business promotional message with a hyperlink to the establishment website, a daily special message with a hyperlink to the establishment menu, and a coupon message with a hyperlink to online coupons so that the user of the present invention is able to choose the correct type of short text message depending upon the respective promotion.

In reference to FIG. 5, the tap handle 1 further comprises a receiver coupling device 9 that communicably coupled with a transmitter coupling device 13 of the wireless power unit 10. As a result, the present invention is able to perform wireless power charging technology between the wireless power unit 10 and the tap handle 1. More specifically, the receiver coupling device 9 is internally positioned within the handle attachment 5 and electrically connected with the handle chipset 7, the LED light 2, and the personal-area network module 8. Resultantly, the electrical power transmitted from the transmitter coupling device 13 can be utilized to power the handle chip set 7, the LED light 2, and the personal-area network module 8. Additionally, the transmitter coupling device 13 is preferably covered with ferrite or other type of protective material for heat submission. The transmitter coupling device 13 is able to transmit focused signal at a distance between 1 millimeter to 6 feet in length, wherein the optimal operating distance is determined according to the different types of the wireless power charging technologies.

Figure 4:
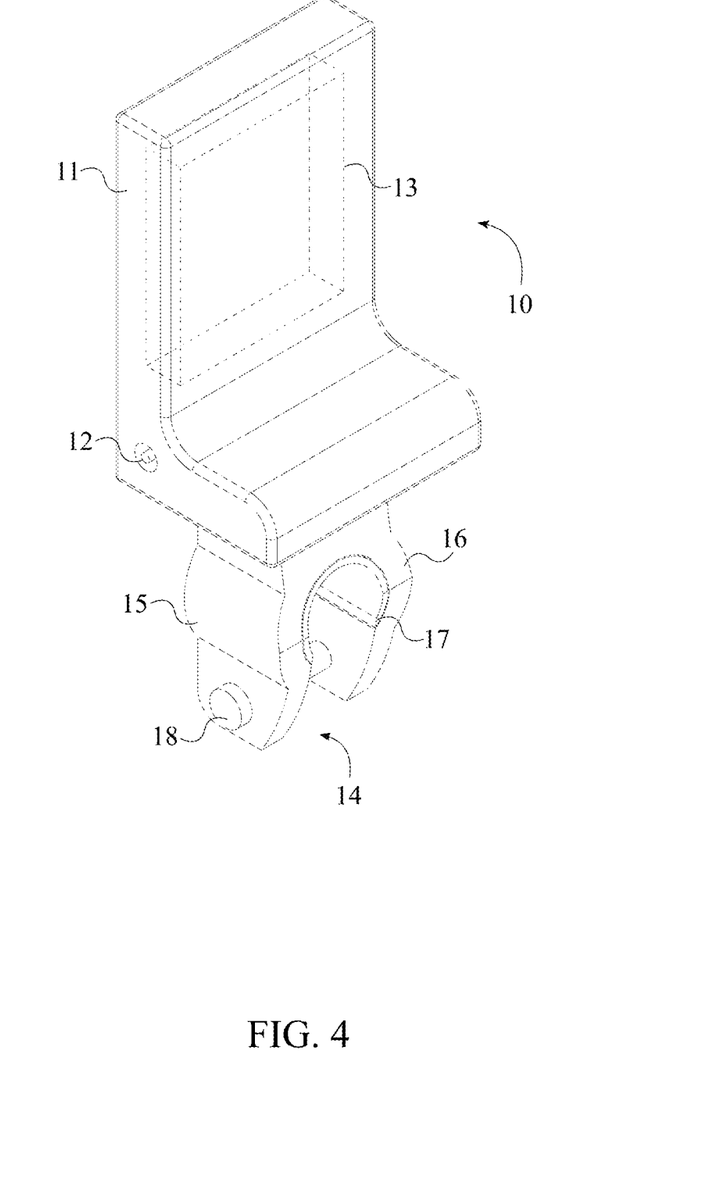
FIG. 4 is a perspective view of the wireless power unit showing internal component transmitter coupling device.

In reference to FIG. 4, the wireless power unit 10 further comprises a housing 11, a power input 12, and an attachment bracket 14 in addition to the transmitter coupling device 13. The power input 12 is integrated into the housing 11 electrically connected with the transmitter coupling device 13 that is internally mounted to the housing 11. More specifically, an external electrical outlet provides electrical current to the power input 12 through an extension cord that converts alternating current into direct current. Due to the electrical connection between the power input 12 and the transmitter coupling device 13, the powers input 12 is then able to power the transmitter coupling device 13. The attachment bracket 14 is terminally connected to the housing 11, preferably to a bottom end of the housing 11, so that the wireless power unit 10 can be mounted to the existing beer towers. The attachment bracket 14 comprises a first arm section 15, a second arm section 16, a friction fit insert 17, and a quick release lock pin 18 as shown in FIG. 1. In reference to the general configuration of the attachment bracket 14, the first arm section 15 and the second arm section 16 are connected to each other delineating a closed end of the attachment bracket 14, adjacent to the housing 11. Resultantly, the opposite end of the first arm section 15 and the second arm section 16 delineate an opened end of the attachment bracket 14 to secure around the existing beer towers. Additionally, the friction fit insert 17 is laterally connected to the first arm section 15 and the second arm section 16 within the opened end and forms a universal fit for different beer towers. The quick release lock pin 18 removably integrated into the first arm section 15 and the second arm section 16 so that the quick release lock pin 18 can compress the first arm section 15 and the second arm section 16 against the existing beer towers, securing the wireless power unit 10 through the attachment bracket 14.

Figure 7:
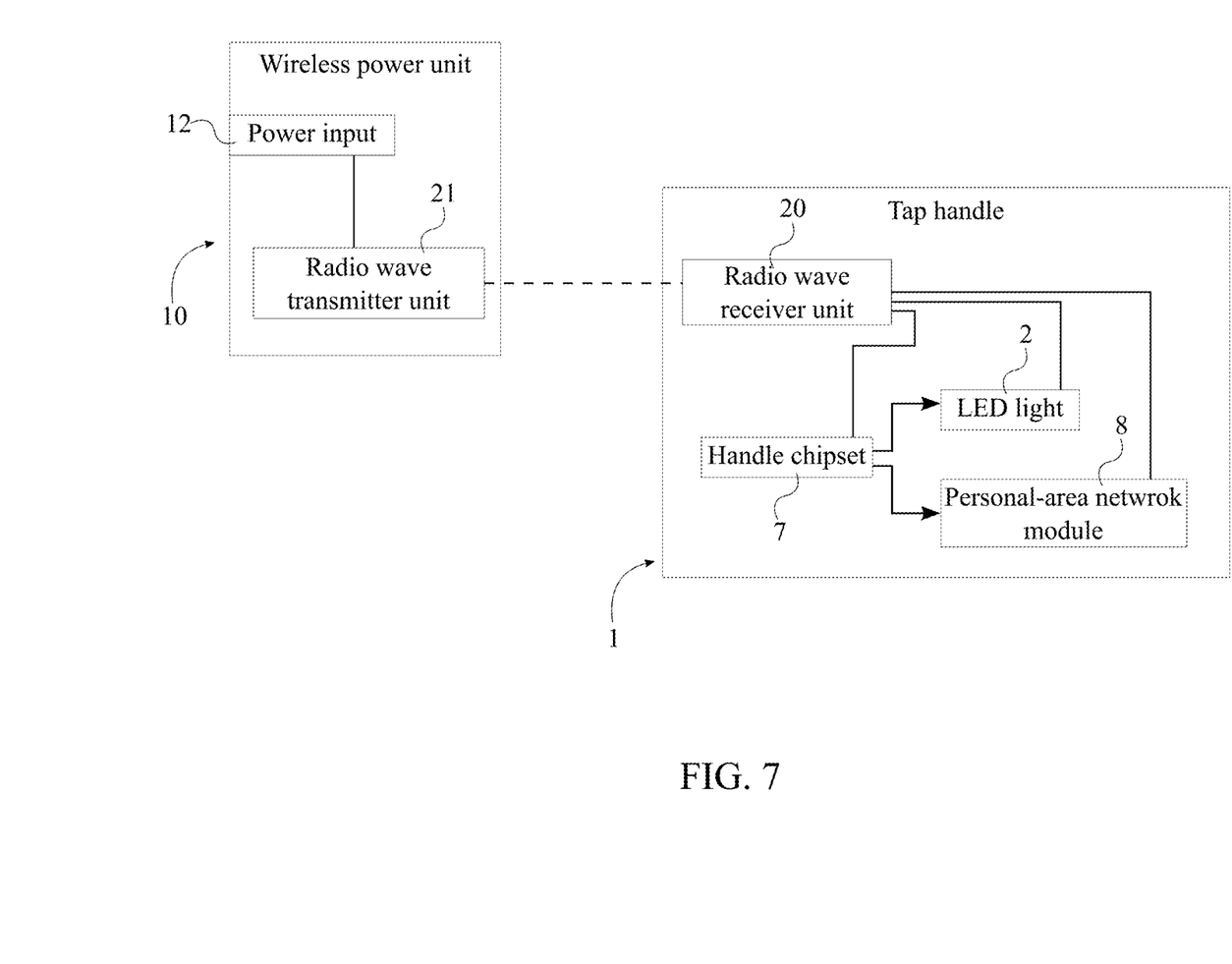
FIG. 7 is a schematic diagram showing the radio wave receive unit as the receiver coupling device, and the radio wave transmitter unit as the transmitter coupling device.

In reference to FIG. 7, the present invention can use a radio wave receiver unit 20 as the receiver coupling device 9 and a radio wave transmitter unit 21 as the transmitter coupling device 13 to accomplish a radio wave wireless power charging technology. Then, the power is transmitted from the radio wave transmitter unit 21 to the radio wave receiver unit 20 powering the LED light 2, the handle chipset 7, and the personal-area network module 8.

Figure 8:
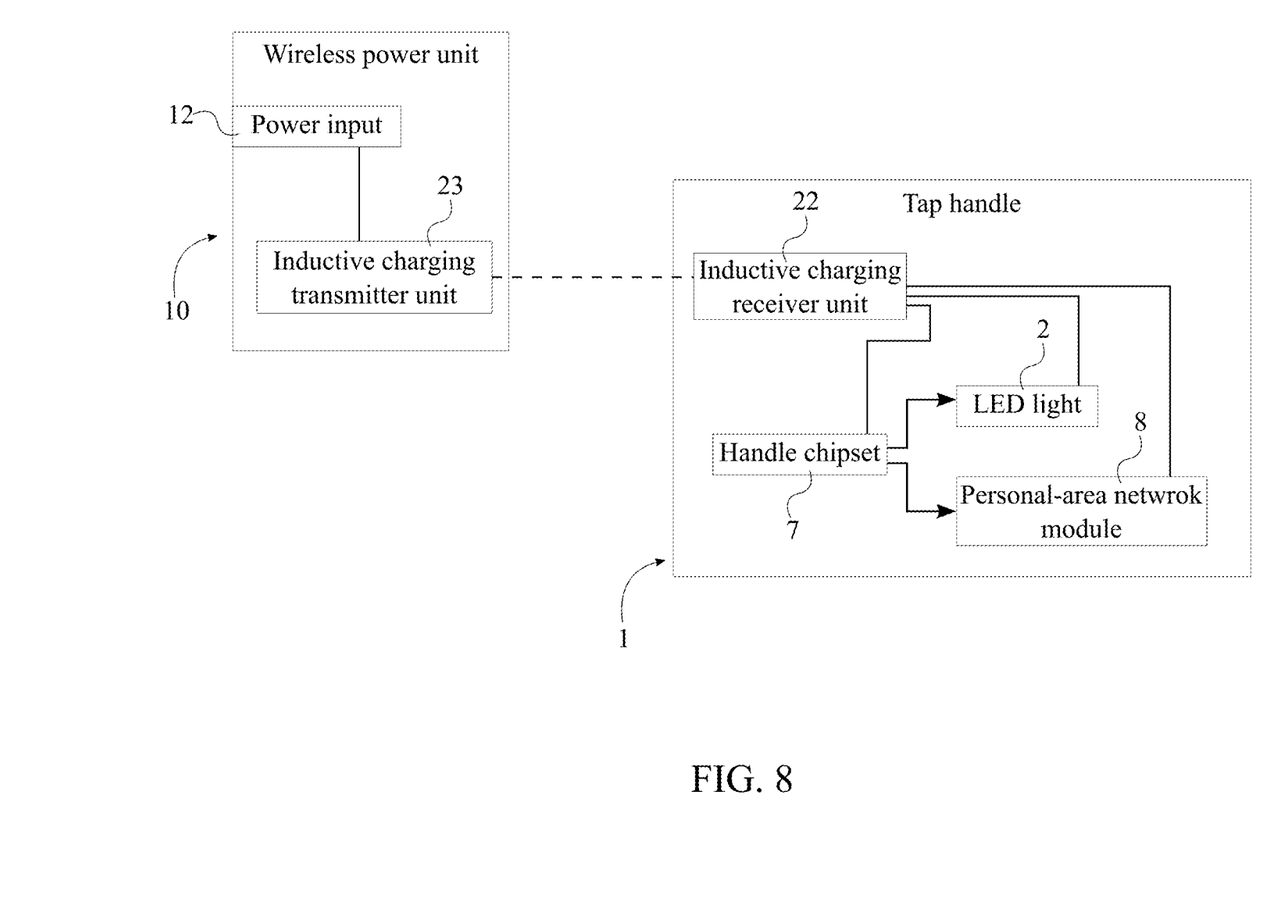
FIG. 8 is a schematic diagram showing the inductive charging unit as the receiver coupling device, and the inductive charging transmitter unit as the transmitter coupling device.

In reference to FIG. 8, the present invention can use an inductive charging receiver unit 22 as the receiver coupling device 9 and an inductive charging transmitter unit 23 as the transmitter coupling device 13 to accomplish an inductive wireless power charging technology. Then, the power is transmitted from the inductive charging transmitter unit 23 to the inductive charging receiver unit 22 powering the LED light 2, the handle chipset 7, and the personal-area network module 8.

Figure 9:
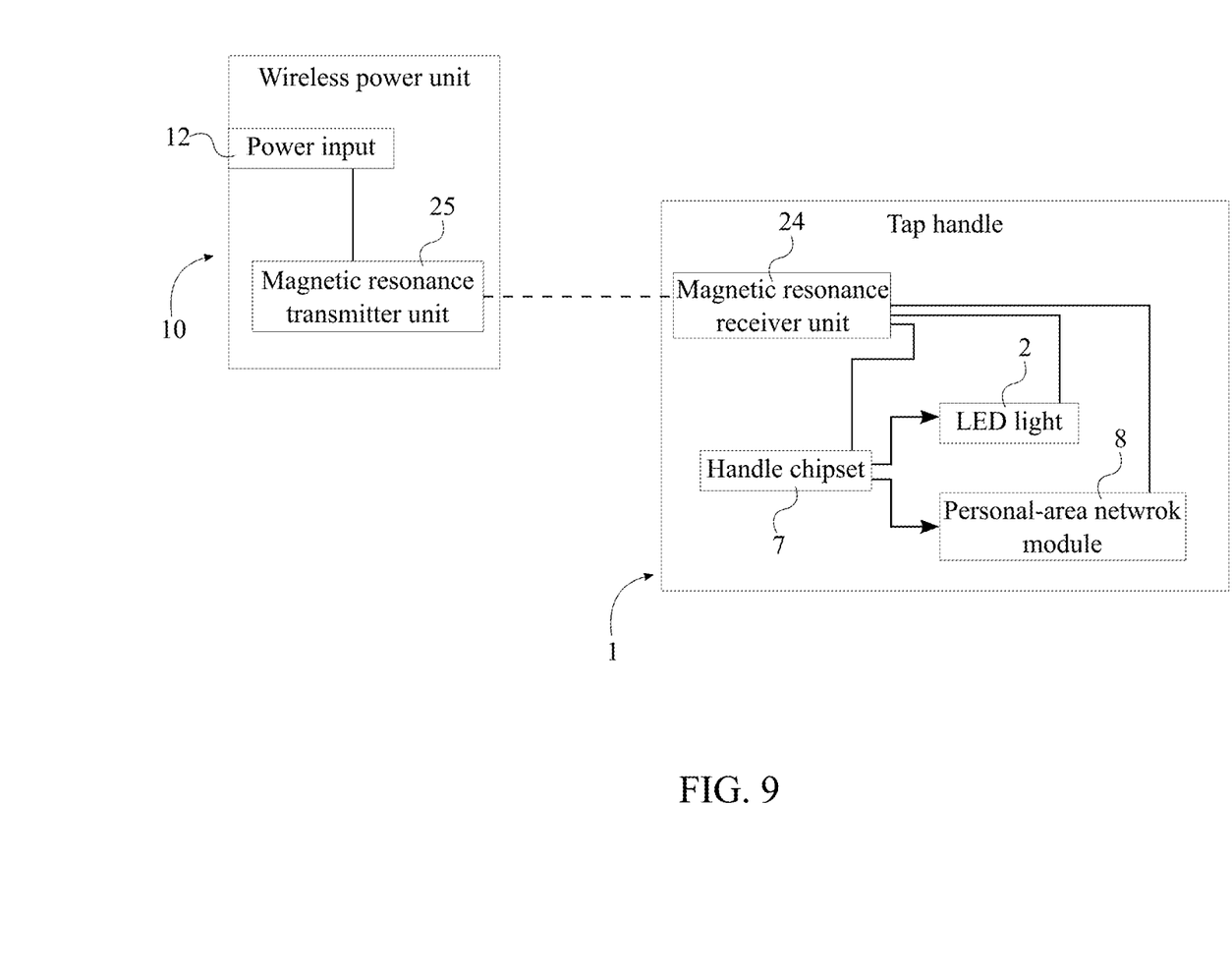
FIG. 9 is a schematic diagram showing the magnetic resonance receive unit as the receiver coupling device, and the magnetic resonance transmitter unit as the transmitter coupling device.

In reference to FIG. 9, the present invention can use a magnetic resonance receiver unit 24 as the receiver coupling device 9 and a magnetic resonance transmitter unit 25 as the transmitter coupling device 13 to accomplish a magnetic resonance wireless power charging technology. Then, the power is transmitted from the magnetic resonance transmitter unit 25 to the magnetic resonance receiver unit 24 powering the LED light 2, the handle chipset 7, and the personal-area network module 8.

Although the invention has been explained in relation to its preferred embodiment, it is to be understood that many other possible modifications and variations can be made without departing from the spirit and scope of the invention as hereinafter claimed.

What is claimed is:

1. A system for wirelessly charging an illuminated tap handle comprises:
    a tap handle;
    a wireless power unit;
    the tap handle comprises a receiver coupling device;
    the wireless power unit comprises a housing, a power input, a transmitter coupling device, and an attachment bracket;
    the transmitter coupling device being electrically connected to the power input;
    the wireless power unit being adjacently positioned to the tap handle; and
    the receiver coupling device being communicably coupled with the transmitter coupling device.

2. The system for wirelessly charging an illuminated tap handle as claim in claim 1 comprises:
    the tap handle further comprises at least one light-emitting diode (LED) light, a transparent body, a handle attachment, a handle chipset, and a personal-area network module;
    the transparent body being hermetically mounted to the handle attachment;
    the LED light being concentrically and internally positioned within the transparent body;
    the LED light being mounted to the handle attachment; and
    the receiver coupling device, the handle chipset, and the personal-area network module being internally positioned within the handle attachment.

3. The system for wirelessly charging an illuminated tap handle as claim in claim 2 comprises:
    a cavity;
    the cavity traversing into the transparent body; and
    the LED light being concentrically and internally positioned within the cavity.

4. The system for wirelessly charging an illuminated tap handle as claim in claim 2 comprises:
    a bottom connector; and
    the bottom connector being concentrically traversing into the handle attachment.

5. The system for wirelessly charging an illuminated tap handle as claim in claim 1 comprises:
    the tap handle further comprises at least one light-emitting diode (LED) light, a handle chipset, and a personal-area network module;
    the LED light and the personal-area network module being communicably coupled connected with the handle chipset; and
    the LED light, the personal-area network module, and the handle chipset being electrically connected with the receiver coupling device.

6. The system for wirelessly charging an illuminated tap handle as claim in claim 5, wherein the tap handle being communicably coupled with a plurality of web enabled computing devices through the personal-area network module.

7. The system for wirelessly charging an illuminated tap handle as claim in claim 1 comprises:
    the power input being integrated into the housing;
    the transmitter coupling device being internally mounted to the housing; and
    the attachment bracket being terminally connected to the housing.

8. The system for wirelessly charging an illuminated tap handle as claim in claim 1 comprises:
    the attachment bracket comprises a first arm section, a second arm section, a friction fit insert, and a quick release lock pin;
    the first arm section and the second arm section being connected to each other, adjacent to the housing;
    the friction fit insert being laterally connected to the first arm section and the second arm section; and
    the quick release lock pin removably integrated into the first arm section and the second arm section.

9. The system for wirelessly charging an illuminated tap handle as claim in claim 1 comprises:
    wherein the receiver coupling device being a radio wave receiver unit; and
    wherein the transmitter coupling device being a radio wave transmitter unit.

10. The system for wirelessly charging an illuminated tap handle as claim in claim 1 comprises:
  wherein the receiver coupling device being an inductive charging receiver unit; and
  wherein the transmitter coupling device being an inductive charging transmitter unit.

11. The system for wirelessly charging an illuminated tap handle as claim in claim 1 comprises:
  wherein the receiver coupling device being a magnetic resonance receiver unit; and
  wherein the transmitter coupling device being a magnetic resonance transmitter unit.

\* \* \* \* \*